W. L. HOWE.
WINDSHIELD ATTACHMENT OR DEFLECTOR FOR AUTOMOBILES AND THE LIKE.
APPLICATION FILED MAR. 24, 1920.
1,384,803. Patented July 19, 1921.
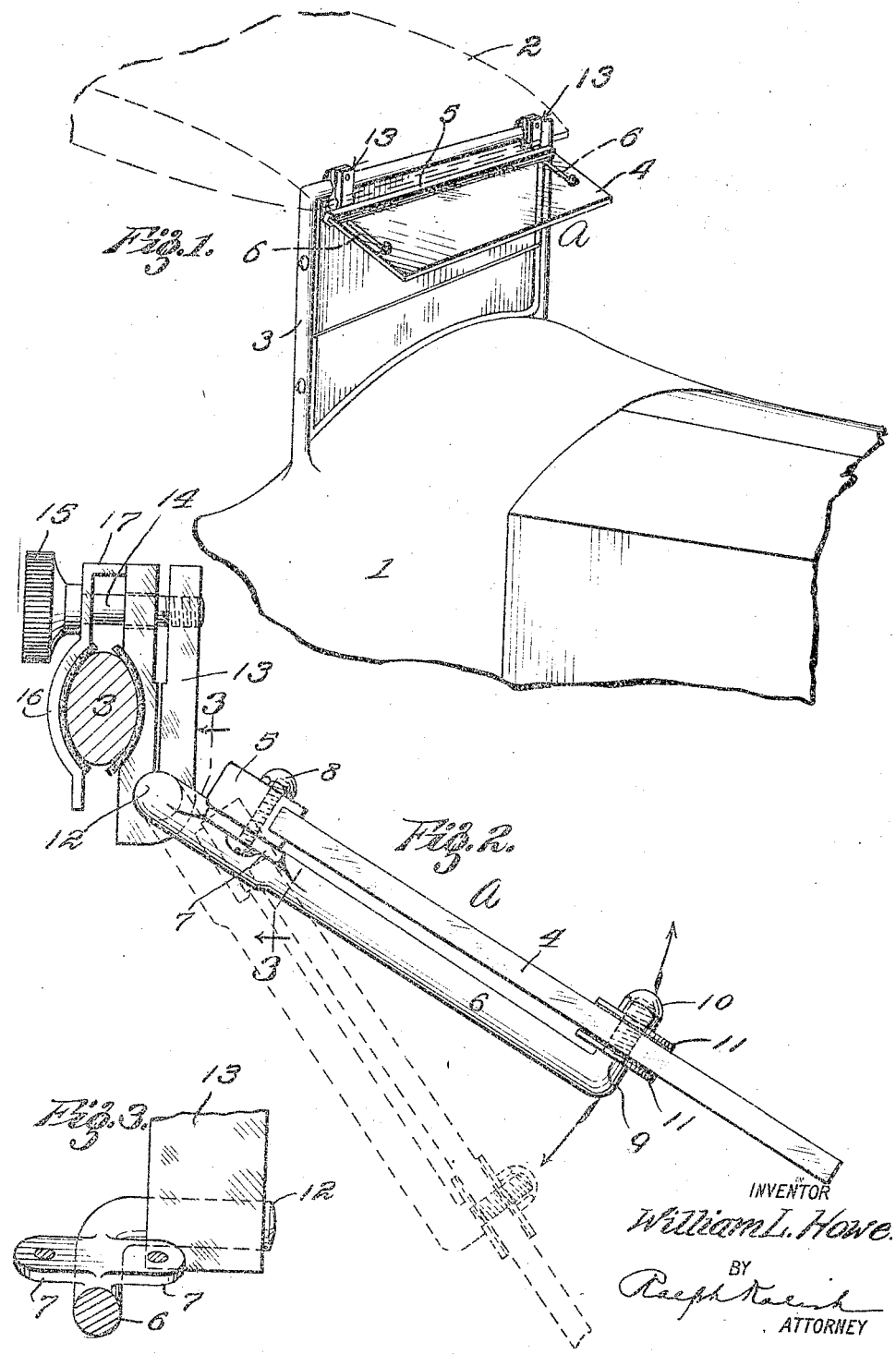

UNITED STATES PATENT OFFICE.

WILLIAM L. HOWE, OF OVERLAND, MISSOURI.

WINDSHIELD ATTACHMENT OR DEFLECTOR FOR AUTOMOBILES AND THE LIKE.

1,384,803. Specification of Letters Patent. Patented July 19, 1921.

Application filed March 24, 1920. Serial No. 369,257.

*To all whom it may concern:*

Be it known that I, WILLIAM L. HOWE, a citizen of the United States, residing at Overland, St. Louis county, Missouri, have invented a certain new and useful Windshield Attachment or Deflector for Automobiles and the like, of which the following is a specification, reference being had to the accompanying drawing, forming a part thereof.

This invention relates generally to automobiles and more particularly to a certain new and useful wind-shield attachment or deflector for automobiles and the like.

My new attachment is especially adapted for use in connection with standard automobile wind-shields, and the principal object of my present invention is to provide an efficient auxiliary storm, wind, and sun deflector which may be readily attached to the fixed frame of the wind-shield proper and which may with ease and convenience be adjustably swung and set to various positions relatively to the wind-shield proper of the automobile.

With the above and other objects in view, my present invention resides in the novel features of form, construction, arrangement, and combination of parts herein after described and afterward pointed out in the claims.

In the accompanying drawing,

Figure 1 is a fragmental perspective view of an automobile equipped with a windshield deflector or attachment constructed in accordance with and embodying my invention;

Fig. 2 is an enlarged side elevational view of the attachment; and

Fig. 3 is a fragmental detail view of the same, taken approximately on the line 3—3, Fig. 2.

Referring now more in detail to the said drawing, which illustrates a practical embodiment of my invention and in which like reference characters refer to like parts throughout the several views, 1 indicates an automobile-body, 2 its top, and 3 its usual fixed or standard wind-shield, the wind-shield proper here shown being of the divided type, so that it may be opened or closed to meet the convenience of the occupants of the automobile.

A indicates my new wind-shield attachment or deflector, which comprises a section of glass or other suitable material 4 of suitable dimensions, as shown, relatively to the automobile and its wind-shield proper 3. This section 4, which may be either transparent or translucent, as desired, is provided at and along its rear end with a grooved frame 5 and is fixed adjacent its opposite ends upon supporting-brackets 6, each bracket 6 being provided adjacent its rear or inner end with a pair of oppositely disposed ears 7—7 disposed flatwise beneath, and fixed by securing-screws or the like 8—8 to, the frame 5, and at its forward or outer end with a laterally upstanding stud 9 projecting through a suitable perforation formed for the purpose in the section 4. The bracket-studs 9 are suitably threaded to receive clamping or binding-nuts 10 for the section 4, and, as shown, suitable washers 11—11 are interposed on each stud 9 on opposite sides of the section 4. It will be evident that, while the section 4 is thus rigidly fixed upon its supporting-brackets 6, substitution or renewal of the section 4 may be readily made by removal of the screws 8 and nuts 10.

Each bracket 6 is formed or provided at its rear or inner end with a lateral inwardly projecting arm or extension 12, which fits loosely in the enlarged bight of a substantially U-shaped somewhat resilient block or hinge 13, the legs of which adjacent their upper ends are provided with registering apertures to accommodate and receive a fastening bolt 14, the aperture in the outer leg of the block 13 being internally threaded for coöperation with the threaded end of the bolt 14. Loosely supported on the bolt 14 intermediate its head 15 and the inner leg of the block 13, as shown, is a clamping-member 16 shouldered at its upper end, as at 17, to engage the block 13 when in clamped position.

In use or operation, bolt 14 being suitably loosened, the attachment is fitted upon the fixed wind-shield 3 as illustrated in Fig. 1, the block 13 and its clamping-member 16 straddling, with the clamping-member 16 disposed upon the inner side and the block 13 being disposed upon the outer side of the wind-shield 3, as seen especially in Fig. 2. The shield or deflector proper 4, the bolt 14 being in loosened condition, may then be easily and conveniently adjustably swung to substantially any desired deflecting position relatively to the fixed wind-shield 3, and then a tightening of the bolts 14 serves not only to rigidly clamp the attachment as a whole upon the wind-shield 3, but also to rigidly clamp the shield or deflector proper 4 in such swung or set position. Should it be desired to change the position of the shield or deflector 4, a loosening of the bolt 14 serves to permit the legs of the block 13 to resiliently spread to permit a ready and convenient swinging of the deflector 4 to adjusted position without necessitating a removal as a whole of the attachment from the wind-shield, a re-tightening of the bolt 14 serving again to conjointly rigidly clamp the attachment as a whole to the wind-shield and the deflector 4 in such adjusted or swung position.

My wind-shield attachment is most efficient as an auxiliary wind, storm, and sun deflector, is, as will be obvious, simple in construction, may be economically and inexpensively manufactured, and may be conveniently attached to, or detached from, the automobile substantially at will.

I am aware that minor changes in the form, construction, arrangement, and combination of the several parts of my attachment may be made and substituted for those herein shown and described without departing from the nature and principle of my invention.

Having thus described my invention, what I claim and desire to secure by Letters Patent is:

1. An attachment of the class described including, in combination, a shield, resilient hinge-members, supporting-brackets secured to the shield and having engagement for swingable adjustment with the hinge-members, and means comprising bolts having engagement with the hinge-members only for conjointly clamping the hinge-members upon an automobile and the brackets and their supported shield in adjustably swung position.

2. An attachment of the class described including, in combination, a shield, resilient substantially U-shaped hinge-members, shield supporting-brackets secured to the shield and having extensions fitted for swingable adjustment in the bight of the hinge-members, and means comprising bolts having engagement with the hinge-members and clamping-members supported on the bolts for conjointly clamping the hinge-members upon an automobile and the brackets and their supported shield in adjustably swung position.

3. An attachment of the class described including, in combination, a shield, a pair of split approximately U-shaped blocks having resilient leg portions, shield supporting-brackets secured to the shield and having laterally disposed pintle-extensions fitted for swingable adjustment in the bight of the blocks, and means for conjointly clamping the blocks as a whole and their carried shield upon an automobile and the legs of the blocks upon the pintles for holding the shield in adjustably swung position, said means comprising bolts having engagement with the legs of the blocks and clamping-members supported on the bolts.

In testimony whereof I have signed my name to this specification.

WILLIAM L. HOWE.